(No Model.) 2 Sheets—Sheet 2.
A. WACHS.
PLANOMETER OR MEASURING PARALLEL RULER.
No. 287,200. Patented Oct. 23, 1883.
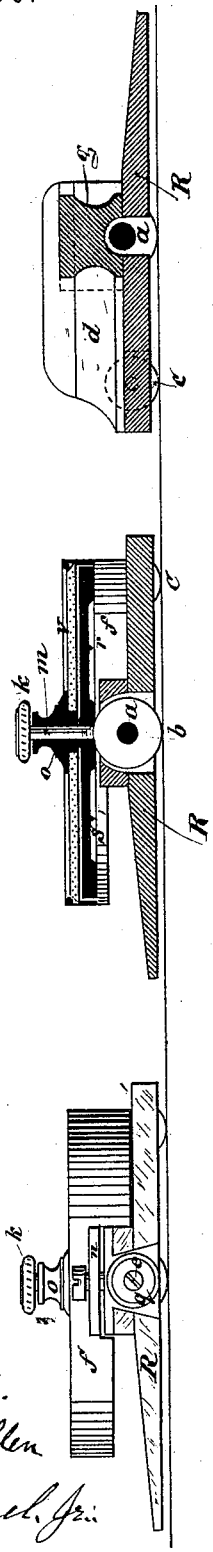
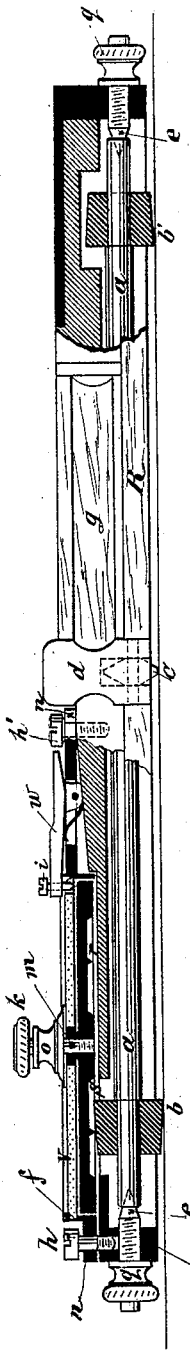
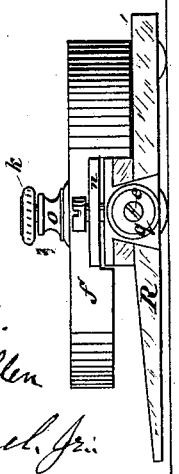
Witnesses.
John F. Allen
J. Gemmel, Jr.
Inventor.
Alfred Wachs
per Henry E. Roeder
Attorney.

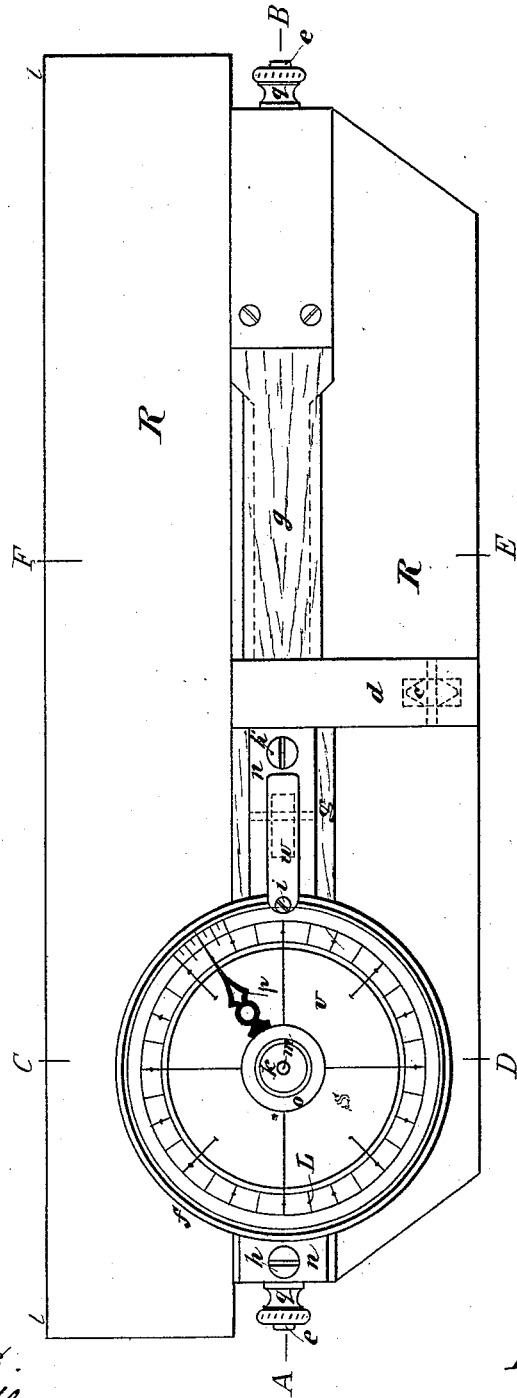

UNITED STATES PATENT OFFICE.

ALFRED WACHS, OF LEIPSIC, GERMANY.

PLANOMETER OR MEASURING PARALLEL RULER.

SPECIFICATION forming part of Letters Patent No. 287,200, dated October 23, 1883.

Application filed March 8, 1883. (No model.)

*To all whom it may concern:*

Be it known that I, ALFRED WACHS, a citizen of Germany, residing at Leipsic, in the Empire of Germany, have invented a new and useful Improvements in Planometers or Measuring Parallel Rulers, of which the following is a specification.

The nature of my invention consists of the arrangement of a ruler supported on wheels, to facilitate its movement over the surface of the paper, in combination with an indicator showing, on an enlarged scale, the amount of motion of the ruler, whereby greater accuracy can be obtained, and the distances of the lines from each other can be easily drawn by the use of this indicator without the necessity of marking the same beforehand.

In the accompanying drawings, Figure I represents a top view of the ruler embodying my invention. Fig. II is an end view of the same. Fig. III is a cross-section at line C D, Fig. I. Fig. IV is a cross-section at line E F, Fig. I. Fig. V is partly a longitudinal section at line A B, Fig. I.

Similar letters represent similar parts in all the figures.

R is the ruler, generally made about twelve inches in length. In about the middle of its width a suitable cavity is made, in which a shaft, $a$, is placed, turning on the center points of the screw-bolts $e$, arranged in the ends of the ruler. This shaft $a$ is provided with two rollers, $b\ b'$, slightly conical, and of such diameter as to raise the bottom of the ruler some little distance above the surface of the paper or other material upon which the ruler is used, to prevent the passing and repassing of the ruler from smutting or soiling the surface. The cavity containing this shaft $a$ and rollers $b\ b'$ is partly covered by a block, $g$, answering at the same time as a handle to take hold of to move the ruler.

At one end of the ruler a case, $f$, is arranged, attached to a spring-plate, $n$, fastened at one end securely to the block $g$, through a screw, $h'$, and at its other end to the end of the ruler R by means of a screw, $h$, in such a manner as to allow said case to be slightly moved nearer to the surface of the ruler or farther away, for the purpose hereinafter described. This case is covered by a glass plate, $v$, on which the desired scale L is engraved or otherwise marked. Below this glass plate $v$ a wheel, $s$, is placed, attached to a spindle, $m$, turning freely in a central hub, $o$, attached to the center of the glass plate $v$, and provided with a knob, $k$, to turn the wheel $s$ by hand, if desired.

On the under side of the disk or wheel $s$ a circular projection or rim, $r$, having a sharp or pointed edge, is arranged, and to its upper side an indicator-band, $p$, is attached; or this band or indicator may be engraved or painted upon the surface of the disk or wheel $s$. The circular projection or rim $r$ bears upon the surface of the conical roller $b$, and receives therefrom, and consequently the disk or wheel $s$, the corresponding motion by friction. This friction may be increased or diminished, as required, by the screw $h$, screwing the plate $n$, together with case $f$ and disk $s$, closer to the surface of the ruler, and consequently upon the roller $b$ or farther away.

To regulate the amount of motion of the disk or wheel $s$, derived from the roller $b$, to the greatest nicety, the rollers $b\ b'$ are made slightly conical, as above mentioned, and the center screws, upon which the shaft $a$ turns, are provided with suitable nuts, $q$, whereby their positions may be changed and fixed, and the shaft $a$, together with these rollers $b\ b'$, may be slightly moved longitudinally in either direction.

$w$ is a small spring-plate hinged to the plate $n$, and provided with a pointed set-screw, $i$, passing through the glass plate $v$, capable, when pressed down, to press upon the disk or wheel $s$, to hold the same fast whenever desired.

$d$ is a block attached to the after part of the ruler R at its middle, and supporting a roller, $c$, projecting through the under side of the ruler, and which, when resting upon the surface of the paper, holds the ruler parallel, or nearly so, with the surface of the paper while the ruler is made to pass or repass over the surface, while when the ruler is used to draw lines, its forward edge, $l$, is pressed down upon the surface of the paper.

It will be readily understood that instead of engraving or otherwise marking the scale L on the under side of the glass plate $v$, the same may be marked upon the surface of the disk or wheel $s$, and the indicator or band $p$ attached, engraved, or painted on the glass plate $v$.

What I claim as my invention, and desire to secure by Letters Patent, is—

1. The combination, with a ruler, R, provided with shaft $a$ and rollers $b\ b'$, the disk or wheel $s$, with projecting circular rim $r$, bearing upon the surface of the roller $b$, scale L, and indicator-band $p$, arranged to operate in the manner and for the purpose substantially as described.

2. In a parallel ruler, the combination of the shaft $a$, provided with slightly-conical rollers $b\ b'$, the center screws, $e\ e$, regulating-nuts $q\ q$, and disk $s$, in contact with one of the conical rollers $b$ through its projecting rim $r$, arranged to operate substantially as and for the purpose described.

ALFRED WACHS.

Witnesses:
OSCAR PFOTENHAUERHÜDOLFF,
GUSTAV LEHMAN.